(12) United States Patent
Kebinger et al.

(10) Patent No.: US 7,647,628 B2
(45) Date of Patent: Jan. 12, 2010

(54) AUTHENTICATION TO A SECOND APPLICATION USING CREDENTIALS AUTHENTICATED TO A FIRST APPLICATION

(75) Inventors: James K. Kebinger, Somerville, MA (US); Brian D. Goodman, Roxbury, CT (US); Konrad C. Lagarde, Milford, CT (US)

(73) Assignee: International Business Machines Corporation, Armonk, NY (US)

( * ) Notice: Subject to any disclaimer, the term of this patent is extended or adjusted under 35 U.S.C. 154(b) by 884 days.

(21) Appl. No.: 10/796,372

(22) Filed: Mar. 9, 2004

(65) Prior Publication Data

US 2005/0204146 A1    Sep. 15, 2005

(51) Int. Cl.
*G06F 7/04* (2006.01)
*G06F 12/14* (2006.01)
*G06F 21/00* (2006.01)

(52) U.S. Cl. .......................... 726/17; 726/16; 713/183
(58) Field of Classification Search ................. 726/2–6, 726/16–19, 21; 713/182–183; 715/742
See application file for complete search history.

(56) References Cited

U.S. PATENT DOCUMENTS

| | | | |
|---|---|---|---|
| 5,604,490 A | | 2/1997 | Blakley, III et al. |
| 5,881,225 A | * | 3/1999 | Worth .......................... 726/17 |
| 6,088,451 A | * | 7/2000 | He et al. .......................... 726/8 |
| 7,194,631 B2 | * | 3/2007 | Numano ..................... 713/183 |
| 2001/0029527 A1 | | 10/2001 | Goshen |
| 2002/0184534 A1 | * | 12/2002 | Rangan et al. ............... 713/201 |

FOREIGN PATENT DOCUMENTS

| | | |
|---|---|---|
| FR | 2 780 797 | 1/2000 |
| WO | WO01/90987 | 11/2001 |

OTHER PUBLICATIONS

Unknown author, "Windows 95/98 Server Connections via Ethernet", copyright 2003, pp. 1-9.*
Unknown author, "SSH FAQ—Manpage of ssh", printed Feb. 2, 2009, content last updated on Nov. 8, 1995, document created on Sep. 9, 1999, printed from: http://www.onsight.com/faq/ssh/manpages/ssh1_man.html, pp. 1-12.*

* cited by examiner

*Primary Examiner*—Ponnoreay Pich
(74) *Attorney, Agent, or Firm*—Stephen Bongini; Fleit, Gibbons, Gutman, Bongini & Bianco P.L.

(57) ABSTRACT

Systems, methods, and program products are provided for switching identity of a user that has a first username associated with a first class of users. According to the method, login information is received from the user, with the login information including the first username, an alternate class, and a password. The user is authenticated based on the first username and the password, and access to the computer system is provided as the alternate class, with the alternate class being different than the first class. In one preferred embodiment, the login information further includes a second username, and access to the computer system is provided with the rights and privileges of the second username.

20 Claims, 4 Drawing Sheets ents that a user has been a different user or class of users or class of users.

AUTHENTICATION TO A SECOND APPLICATION USING CREDENTIALS AUTHENTICATED TO A FIRST APPLICATION

BACKGROUND OF THE INVENTION

1. Field of the Invention

The present invention relates to computer systems, and more specifically to a system, method, and program product for authenticating as one user but providing access as a different user or class of users.

2. Description of Related Art

In today's computing environment, significant measures are taken to prevent unauthorized access to computer systems and networks while providing authorized users or classes of users with enhanced computing experiences. In the context of computer security, "authentication" is the process of establishing the identity of a client or user. The authentication is usually based on the user's credentials, which may describe the user's identity, group memberships, administrative roles, special privileges, and so on. "Authorization" is the process of transforming a confirmed identity of a client or user into the set of actions that the client can and cannot perform on the computer system being accessed.

A user account is often associated with classes of users. This association exists for at least two reasons. The first reason is authorization; privileges for the entire class (i.e., group) of users can be maintained with greater ease than by managing at a per-user level. The second reason is for preferences related to the user experience; in this case the experience presented to the user can be altered based on the user's class association.

It is often useful for a user to be able to temporarily step (or "morph") into the role of another user or class of users. This is particularly useful during the testing and development of web applications. Additionally, such identity switching is useful in support roles by enabling a support staff member without access to a user's password to view what the user, or anyone in the user's class, views.

Most conventional computer systems do not provide the ability for a user to assume the role of another user or a class of other users. While some non-web based computer systems provide limited capability for a user to switch to another user identity (e.g., the "su" command in Unix/Linux computer systems and the CVIEW command in VM computer systems), these conventional commands only allow the root or administrator to switch identity without providing the other user's password. Furthermore, conventional computer systems that provide the ability for a user to access the system as a different user or class of users require at least two steps of entering user IDs and passwords (and possibly other information) before performing authentication and identity switching. Moreover, these conventional computer systems do not maintain an audit trail of which physical user actually performed an activity regardless of that user's actual system identity at the time the activity is performed.

Accordingly, there is a need for a system and method of authenticating as one user but authorizing access as a different user or class of users in a single step, while maintaining appropriate audit trails of a user's activity regardless of that user's system identity at the time the activity is performed.

SUMMARY OF THE INVENTION

It is an object of the present invention to provide systems, methods, and program products for authenticating as one user or class of users and then authorizing access as a different user or class of users.

Another object of the present invention is to allow a user to select another user and/or class of users to switch to at login time, such that the identity switching operation can be performed in one step.

Yet another object of the present invention is to allow identity switching within a system after login has occurred.

A further object of the present invention is to provide an audit trail for a user for any actions taken regardless of the user's present system identity.

One embodiment of the present invention provides a method for switching identity of a user that has a first username associated with a first class of users. According to the method, login information is received from the user, with the login information including the first username, an alternate class, and a password. The user is authenticated based on the first username and the password, and access to the computer system is provided as the alternate class, with the alternate class being different than the first class. In a preferred embodiment, the login information further includes a second username, and access to the computer system is provided with the rights and privileges of the second username.

Another embodiment of the present invention provides a system for switching identity of a user that has a first username associated with a first class of users. The system includes an interface receiving login information from the user, and a processor. The login information includes the first username, an alternate class, and a password. The processor authenticates the user based on the first username and the password, and provides access to the computer system as the alternate class. In one preferred system, the processor provides the user with the experience of a user in the alternate class.

Other objects, features, and advantages of the present invention will become apparent from the following detailed description. It should be understood, however, that the detailed description and specific examples, while indicating preferred embodiments of the present invention, are given by way of illustration only and various modifications may naturally be performed without deviating from the present invention.

DETAILED DESCRIPTION OF PREFERRED EMBODIMENTS

Preferred embodiments of the present invention provide systems, methods, and program products for authenticating as one user but authorizing access to a computer system as a different user or class of users in a single step. Preferably, appropriate audit trails of a user's activity are maintained regardless of that user's system identity at the time the activity is performed.

Figure 1:
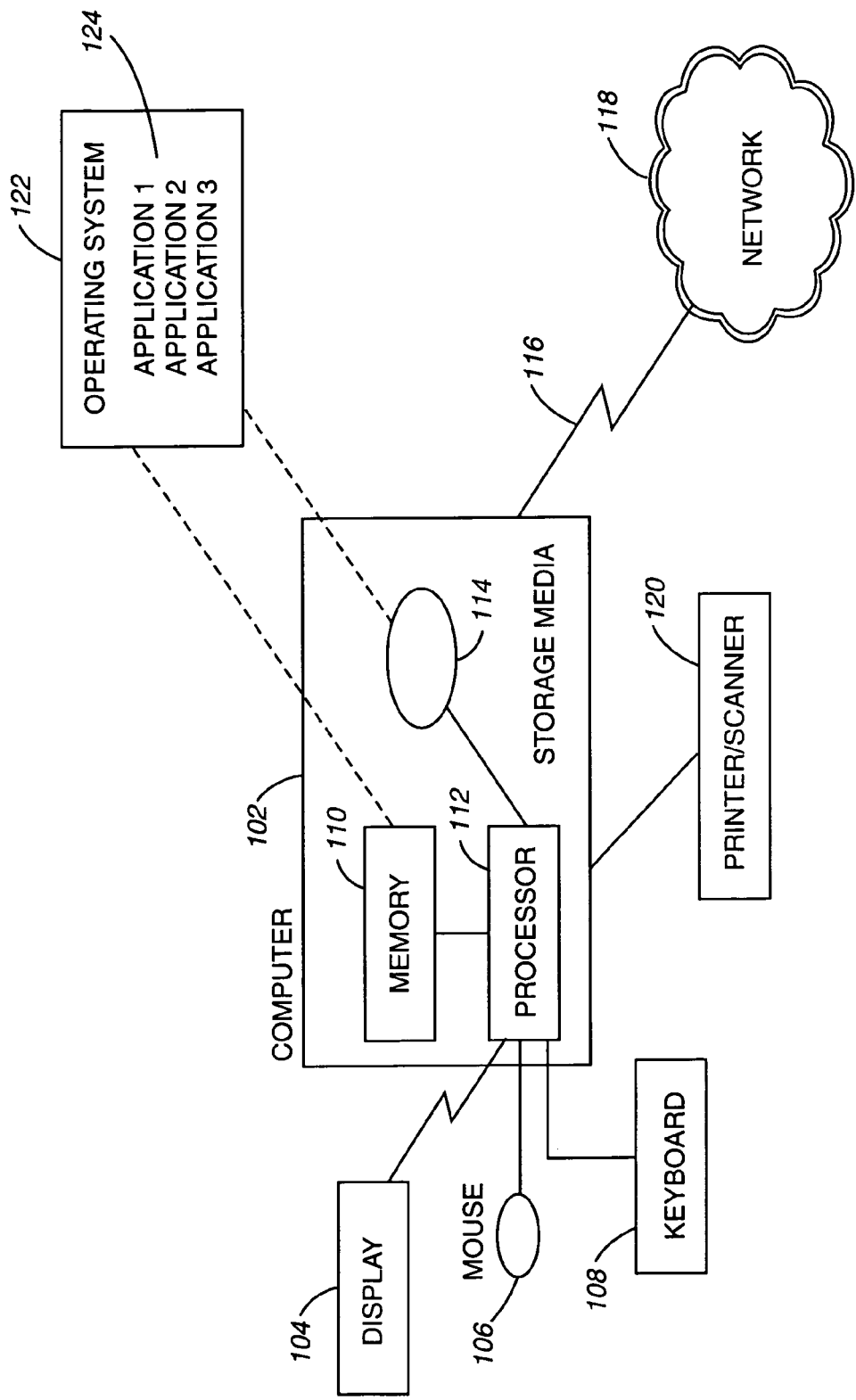
FIG. 1 is a block diagram illustrating an exemplary computer system.

FIG. 1 shows an exemplary computer system for presenting and maintaining user applications. The exemplary computer system 100 includes a computer 102 that has a processor 112, storage media 114 (e.g., magnetic disk), and main memory 110. An operating system and several application programs 122 reside on the storage media 114 and are loaded into main memory 110 during operation as needed. The computer 102 further includes peripheral devices such as a video display 104, a printer/scanner 120, a keyboard 108, a pointing device 106 (e.g., mouse), and an interface 116 for connecting to a network 118. During operation, a user interacts with a Graphical User Interface (GUI) presented on the display 104 by using the keyboard 108 and mouse 106 under control of the operating system and/or one of the application programs (e.g., Application 1). The operating system and application programs can interact with remote users and systems by way of the network 118.

Figure 2:
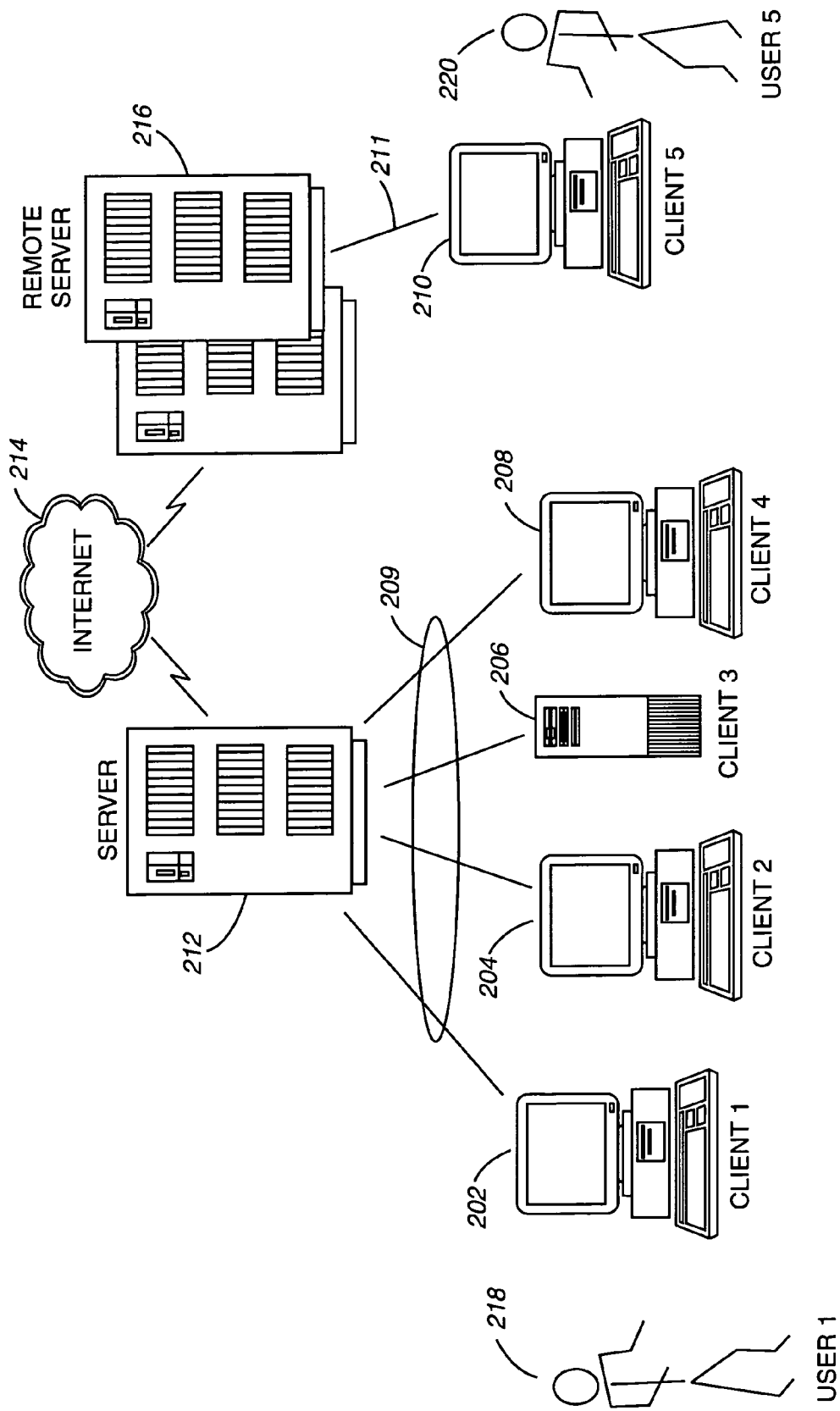
FIG. 2 is a block diagram illustrating an exemplary client-server network system.

The exemplary computer system 100 of FIG. 1 can be part of a client-server network system, as illustrated in FIG. 2. The exemplary network system 200 includes multiple client computer systems, such as Client 1 202, Client 2 204, Client 3 206, and Client 4 208. These clients are connected to a server 212 via a network, such as local area network (LAN) 209. The server 212 is connected to a remote server 216 via another network, such as the Internet 214. Additional client computer systems, such as Client 5 210 are connected to the remote server 216 via another LAN 211. A user User 1 218 can use one of the clients, such as Client 1 202, to run applications, and can interact with other local or remote clients, such as Client 2 204, and users, such as User 5 220, by way of the server 212. Client applications 112 can be provided on each client, or the server 212 or remote server 216 can provide the applications over the network 209.

Figure 3:
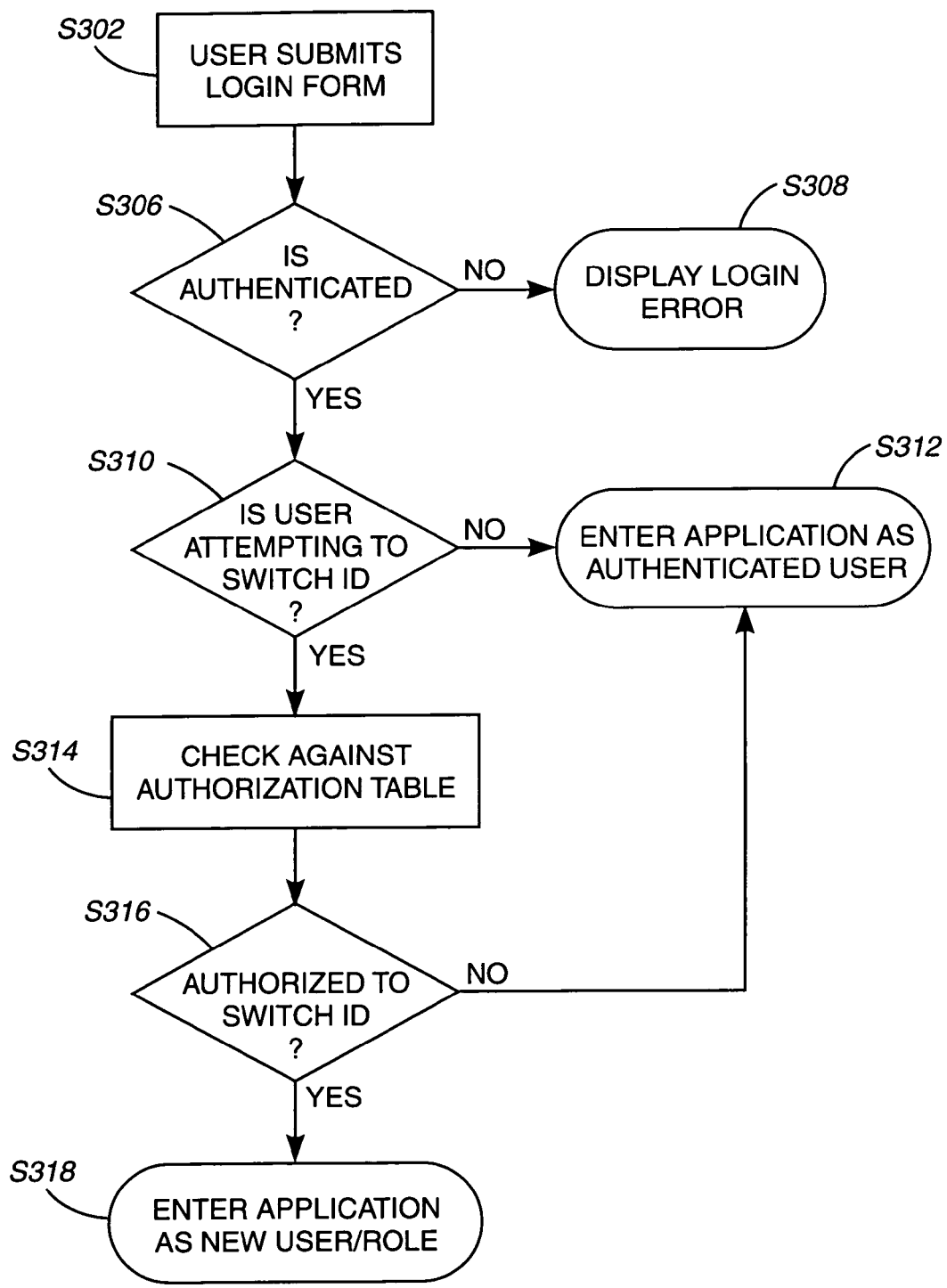
FIG. 3 is a flow chart illustrating a process for authenticating as one user and then authorizing access to a computer system as a different user or class of users according to a preferred embodiment of the present invention.

FIG. 3 illustrates a flow chart of a process for authenticating as one user while authorizing access to a computer system as a different user or class of users in a single step according to a preferred embodiment of the present invention. According to the process 300, login information is provided by a user (step S302), and the identity of the user is authenticated using the username from the login information (step S306). If the user is authenticated, it is determined if the user is attempting to switch identity based on whether an alternate username or class is included in the login information (step S310). If so, an authorization table is checked to determine if the user is authorized to switch to the alternate username and/or class (step S314). If the requested identity switching is authorized (step S316), the user enters the application (i.e., computer system) as the alternate user and/or class (step S318).

The operation of one exemplary embodiment will now be described in detail. In this embodiment, a user is queried for login information by presenting the user with a web based form over a secure connection using secured sockets layer (SSL). The form contains two fields for entering a username and a password, respectively. The user enters a username into the first field. Additionally, the user can optionally enter a colon and an alternate username, two colons and an alternate class (or group) name, or a colon and both an alternate username and class separated by a colon. The user enters a password for the first username and then submits the web form to the target server. In some embodiments, the login information that is provided also includes further information, such as an identifier, a private key, a public key, a token, a smart card input, or a biometric device input.

Figure 4:
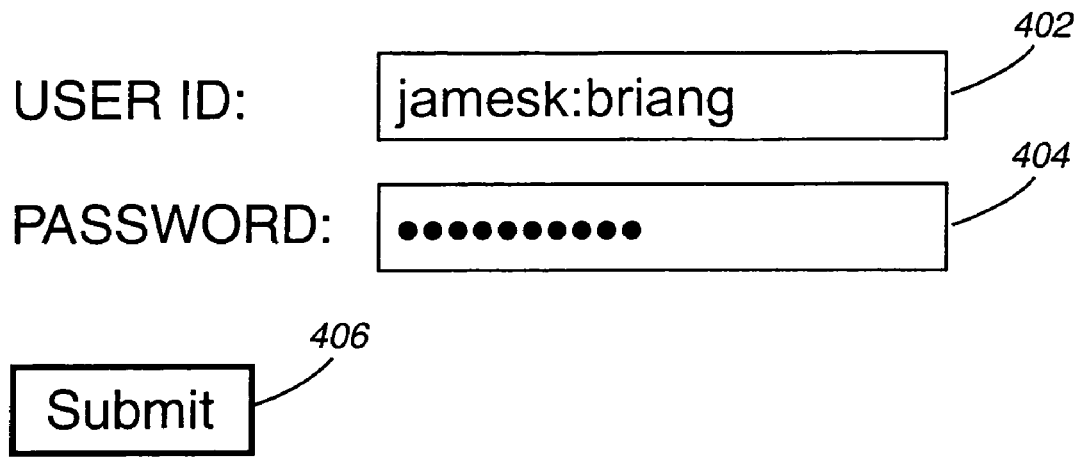
FIGS. 4 and 5 show a user interface login display of one embodiment of the present invention.
Figure 5:
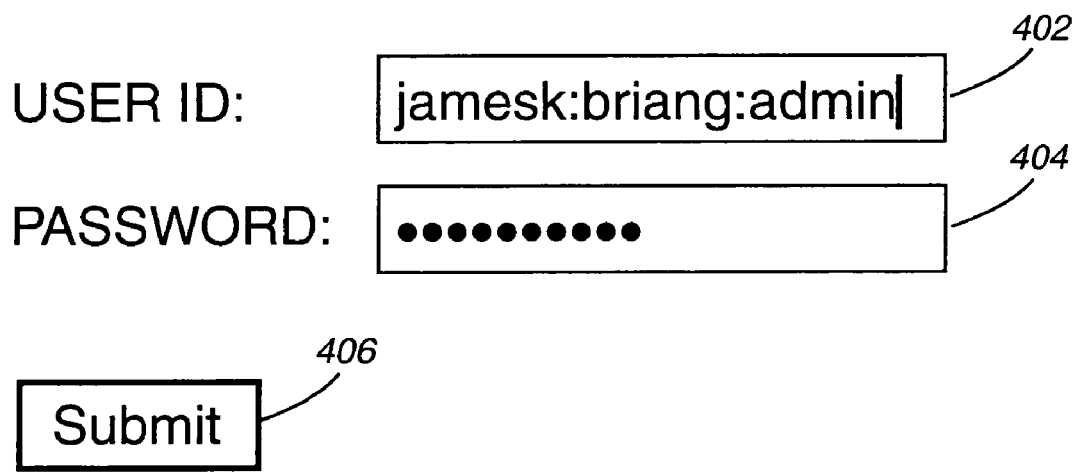

FIGS. 4 and 5 show an exemplary user interface web form for this embodiment of the present invention. In the example of FIG. 4, the user interface login display 400 shows that the user entered into the username field 402 his username "jamesk" followed by a colon and then an alternate username "briang". In other words, user "jamesk" is requesting to access the computer system in the role of "briang". The user also enters his password into the password field 404 and clicks on the submit button 406 to transmit the entered login data to the server.

In the example of FIG. 5, the user interface login display 500 shows that the user entered into the username field 402 his username "jamesk" followed by a colon and then an alternate username "briang" followed by another colon and then an alternate class name "admin". In other words, user "jamesk" is requesting to access the computer system in the user role of the user "briang" and in the class role of the "admin" class of users. Thus, in both cases the login information entry for authenticating as one user but authorizing access as an alternate user or/or class of users is accomplished in one step (i.e., by providing the alternate username and/or password as part of the username string that is entered).

After the submit button 406 is clicked, the server receives the entered login information (step S302). The server authenticates the user using the password from the password field 404, and the first string from the username field 402, which equates to the username with which the password is associated (step S306). In this embodiment, this authentication is performed using a central repository (e.g., an enterprise directory) that stores username identities and passwords for all system users in a defined environment. This authentication can be performed locally or remotely to the computer system. Preferably, a common application programming interface (API) is used to securely access the username and password credentials. If authentication fails, an error message is presented to the user (step S308). If the user is authenticated, the server determines if the user is attempting to switch identity (step S310). More specifically, the server determines if a second and/or third string (as separated by colons) is present in the username field 402.

After a successful authentication, the system determines whether the user is attempting to switch identity (step S310). If the authenticated user is not attempting to identity switch (i.e., neither a second nor a third string is present in the username field), the user enters the system in the normal manner (step S312). If either or both a second and a third string are present in the username field, the server verifies that the user (as identified by the username form the first string in the username field) is permitted to switch to the role of the user identified by the second string and/or the class of users identified by the third string (step S314). This verification is based on an authorization table stored in a relational database, a group based directory system, or any other appropriate storage system (e.g., LDAP, XML, JDO, one or more text files, compressed binary data, serialized object code, or an object-oriented database). Further, this verification can be performed locally or remotely to the computer system.

If the user is not authorized to switch to the requested user or class identity (step S316), an error message is presented and the user enters the system in the normal manner (step S312). On the other hand, if the requested identity switch is authorized, the system provides access tailored to the alternate user and/or class that was specified (step S318). In other words, the user is given access to the web based application as if he were the alternate user and/or as if he was in an alternate class of users. Thus, the user is provided with the experience of the alternate user and/or class. Preferably, the user is also given the rights and privileges of the alternate user and/or class.

For example, consider the case in which Brian (briang) is a member of the web technology group, James (jamesk) is a member of the IP law group, and the system is personalized at the class level by presenting an experience that is different for different classes of users. In particular, the system is personalized for the web technology class of users to provide them with content regarding web technologies at login, and the same system is personalized for the IP law class of users to present them with content regarding IP law at login. Thus, if Brian just provides his username and password at login, then his class of "webtech" is used to provide him with the web technology content.

However, the system can use the identity switching process to allow a user to specify the desired type of content when logging in. Then, if Brian logs in with a requested identity of IP law ("briang::iplaw"), he is provided with the experience of a user in the IP law class regardless of his class. Similarly, if Brian is assisting James with debugging a web application that James is using, Brian could be authorized to login with a switch or morph to the identity of James ("briang:jamesk"). In this embodiment, the general format of the username field for requesting an identity switch is: <username>:<alt. username>:<alt. class>.

In other example, Konrad is the manager of James, and has delegated to James the responsibility for keeping apprised of the enterprise dashboard day to day activities. The enterprise dashboard consolidates a custom view for each manager of the key aspects of the company. James enters the appropriate URL and is presented with a web form asking for his username and password. James enters into the username field his own username, a colon, and then his manager's username ("jamesk:konradl"). James enters his password into the password field and submits the form.

The enterprise dashboard server receives James' login information (including the request to switch to Konrad's identity) and authenticates him by connecting to the enterprise directory with the username and password that were provided. If this authentication is successful, the enterprise dashboard server then verifies that Konrad has authorized James to switch to his identity by checking a simple registry stored in a database. If James' username is authorized to access Konrad's identity, James is given access as if he were Konrad. Similarly, if James is one of the administrators for the enterprise dashboard, James can enter in the username field his own username, a colon, his manager's username, another colon, and the administrator class of users ("jamesk:konradl: admin"). If authorized, this provides James to use Konrad's identity and enables an administrative view.

Accordingly, the preferred embodiment of the present invention provides a method for securely accessing a computer system and switching to experience the system as another user or class of user in one step. The user is given access to a computer system or application as if the alternate user and/or in the alternate class of users. That is, the user is provided with the experience, rights, and privileges of the alternate user and/or class of users. Thus, the user can temporarily step into the role of the other user or class of users. This is particularly useful during the testing and development of web applications. Additionally, such identity switching is useful in support roles by enabling a support staff member without access to a user's password to view what the user, or anyone in the user's class, views.

Further, the system maintains an audit trail in the usual manner, except that audit trail entries are based on the user's actual identity (e.g., jamesk) regardless of any identity switching that is active. More specifically, events are recorded to an audit trail database or log file with the user's actual username. Alternatively or additionally, events can be tracked and certain predefined events can trigger alerts.

The process of preferred embodiments is transparent to the user. In particular, after the user submits the login information the system administers the remaining steps of the identity switching process. Accordingly, the actions of authenticating and identity switching are accomplished in one user step.

The systems and methods of the present invention can be realized in hardware, software, or a combination of hardware and software. A system according to a preferred embodiment of the present invention can be realized in a centralized fashion in one computer system, or in a distributed fashion where different elements are spread across several interconnected computer systems. Any kind of computer system—or other apparatus adapted for carrying out the methods described herein—is suitable. A typical combination of hardware and software could be a general-purpose computer system with a computer program that, when being loaded and executed, controls the computer system such that it carries out the methods described herein.

An embodiment of the present invention can also be embedded in a computer program product, which comprises all the features enabling the implementation of the methods described herein, and which—when loaded in a computer system—is able to carry out these methods. Computer program means or computer program as used in the present invention indicates any expression, in any language, code or notation, of a set of instructions intended to cause a system having an information processing capability to perform a particular function either directly or after either or both of the following a) conversion to another language, code or, notation; and b) reproduction in a different material form.

A computer system may include, inter alia, one or more computers and at least a computer program product on a computer readable medium, allowing a computer system, to read data, instructions, messages or message packets, and other computer readable information from the computer readable medium. The computer readable medium may include non-volatile memory, such as ROM, Flash memory, Disk drive memory, CD-ROM, and other permanent storage. Additionally, a computer readable medium may include, for example, volatile storage such as RAM, buffers, cache memory, and network circuits. Furthermore, the computer readable medium may comprise computer readable information in a transitory state medium such as a network link and/or a network interface, including a wired network or a wireless network, that allow a computer system to read such computer readable information.

Although several embodiments of the present invention and its advantages have been described in detail, it should be understood that changes, substitutions, transformations, modifications, variations, permutations and alterations may be made therein without departing from the teachings of the present invention, the spirit and the scope of the invention being set forth by the appended claims.

What is claimed is:

1. A method for switching identify of a user that has a first username associated with a first class of users, the method comprising the steps of:

receiving, by a computer system, login information from the user, the login information including the first username, an alternate class, and a password associated with the first username, the first username and the alternate class being received as part of a user identification input of the login information entered by the user, the first username and alternate class being entered by the user as a single data field entry, the first username being associated with a class of users granted a first set of rights and privileges associated with the computer system, and the alternate class being granted a second set of rights and privileges associated with the computer system;

authenticating, by the computer system, the user based on the first username and the password; and providing, by the computer system, access to the computer system as the alternate class, wherein the alternate class is different than the first class.

2. The method of claim 1, wherein the login information further includes a second username entered by the user as part of the user identification input in addition to the first username and the alternate class, and in the providing step, access to the computer system is provided with the rights and privileges of the second username.

3. The method of claim 1, further comprising the step of:

verifying that the user is authorized to be provided access to the computer system as the alternate class, wherein the providing step is only performed if the user's authorization is verified.

4. The method of claim 3, wherein the verifying step includes the sub-step of looking up the first username in an identity switching authorization table.

5. The method of claim 1, wherein the providing step includes the sub-step of presenting the user with a user interface of the alternate class after login.

6. The method of claim 1, wherein in the providing step, the user is provided with the experience of a user in the alternate class.

7. The method of claim 1, wherein in the receiving step, the first username and alternate class are entered in the single data field entry as a single character string so that identity switching that gives the user access to the computer system with the set of rights and privileges granted to the alternate class is accomplished in only one user step that comprises the user logging into the computer system using only the first username, the alternate class, and the password.

8. The method of claim 1, further comprising the step of recording an audit trail that includes at least some of the actions performed by the user, the audit trail including the first username.

9. A computer storage medium encoded with a computer program for switching identity of a user that has a first username associated with a first class of users, the computer program containing instructions for performing the steps of:

receiving, by a computer system, login information from the user, the login information including the first username, an alternate class, and a password associated with the first username, the first username and the alternate class being received as part of a user identification input of the login information entered by the user, the first username and alternate class being entered by the user as a single data field entry, the first username being associated with a class of users granted a first set of rights and privileges associated with the computer system, and the alternate class being granted a second set of rights and privileges associated with the computer system;

authenticating, by the computer system, the user based on the first username and the password; and providing, by the computer system, access to the computer system as the alternate class, wherein the alternate class is different than the first class.

10. The computer storage medium of claim 9, wherein the login information further includes a second username entered by the user as part of the user identification input in addition to the first username and the alternate class, and in the providing step, access to the computer system is provided with the rights and privileges of the second username.

11. The computer storage medium of claim 9, wherein the computer program further contains instructions for performing the step of:

verifying that the user is authorized to be provided access to the computer system as the alternate class, wherein the providing step is only performed if the user's authorization is verified.

12. The computer storage medium of claim 9, wherein the providing step includes the sub-step of presenting the user with a user interface of the alternate class after login.

13. The computer storage medium of claim 9, wherein in the providing step, the user is provided with the experience of a user in the alternate class.

14. The computer storage medium of claim 9, wherein in the receiving step, the first username and alternate class are entered in the single data field entry as a single character string so that identity switching that gives the user access to the computer system with the set of rights and privileges granted to the alternate class is accomplished in only one user step that comprises the user logging into the computer system using only the first username, the alternate class, and the password.

15. A system for switching identify of a user that has a first username associated with a first class of users, the system comprising:

an interface of a computer system receiving login information from the user, the login information including the first username, an alternate class, and a password associated with the first username, the first username and the alternate class being received as part of a user identification input of the login information entered by the user, the first username and alternate class being entered by the user as a single data field entry, the first username being associated with a class of users granted a first set of rights and privileges associated with the computer system, and the alternate class being granted a second set of rights and privileges associated with the computer system;

a processor authenticating the user based on the first username and the password, and providing access to the computer system as the alternate class, wherein the alternate class is different than the first class.

16. The system of claim 15, wherein the login information further includes a second username entered by the user as part of the user identification input in addition to the first username and the alternate class, and the processor provides access to the computer system with the rights and privileges of the second username.

17. The system of claim 15, wherein the processor verifies that the user is authorized to be provided access to the computer system as the alternate class, and provides access to the computer system as the alternate class only if the user's authorization is verified.

18. The system of claim 15, wherein the processor presents the user with a user interface of the alternate class after login.

19. The system of claim 15, wherein the processor provides the user with the experience of a user in the alternate class.

20. The system of claim 15, wherein the interface receives entry of the first username and alternate class in the single data field entry as a single character string so that identity switching that gives the user access to the computer system with the set of rights and privileges granted to the alternate class is accomplished in only one user step that comprises the user logging in to the computer system using only the first username, the alternate class, and the password.

* * * * *

UNITED STATES PATENT AND TRADEMARK OFFICE
CERTIFICATE OF CORRECTION

PATENT NO.      : 7,647,628 B2                                  Page 1 of 1
APPLICATION NO. : 10/796372
DATED           : January 12, 2010
INVENTOR(S)     : Kebinger et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1553 days.

Signed and Sealed this

Sixteenth Day of November, 2010

David J. Kappos
*Director of the United States Patent and Trademark Office*